UNITED STATES PATENT OFFICE.

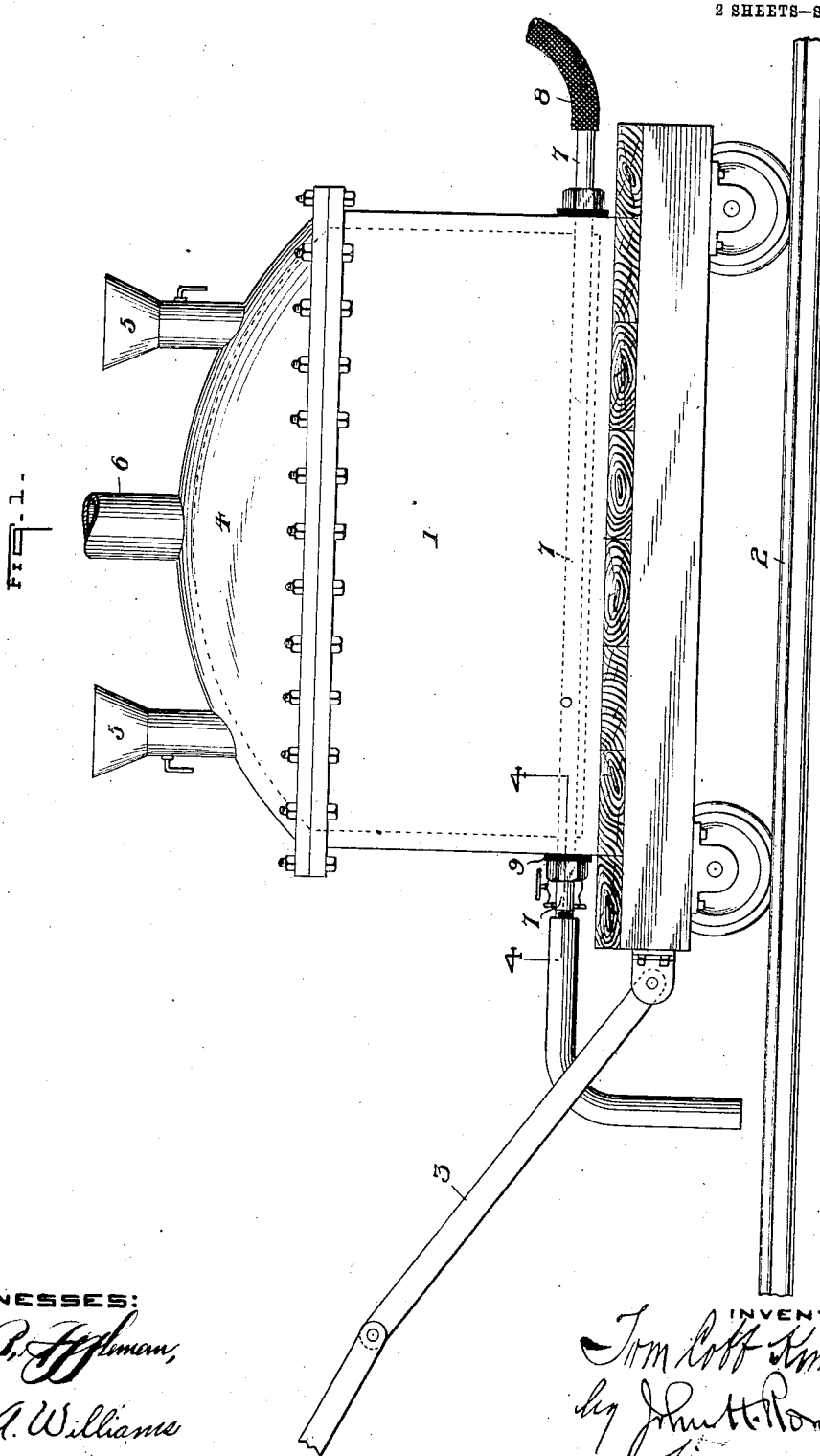

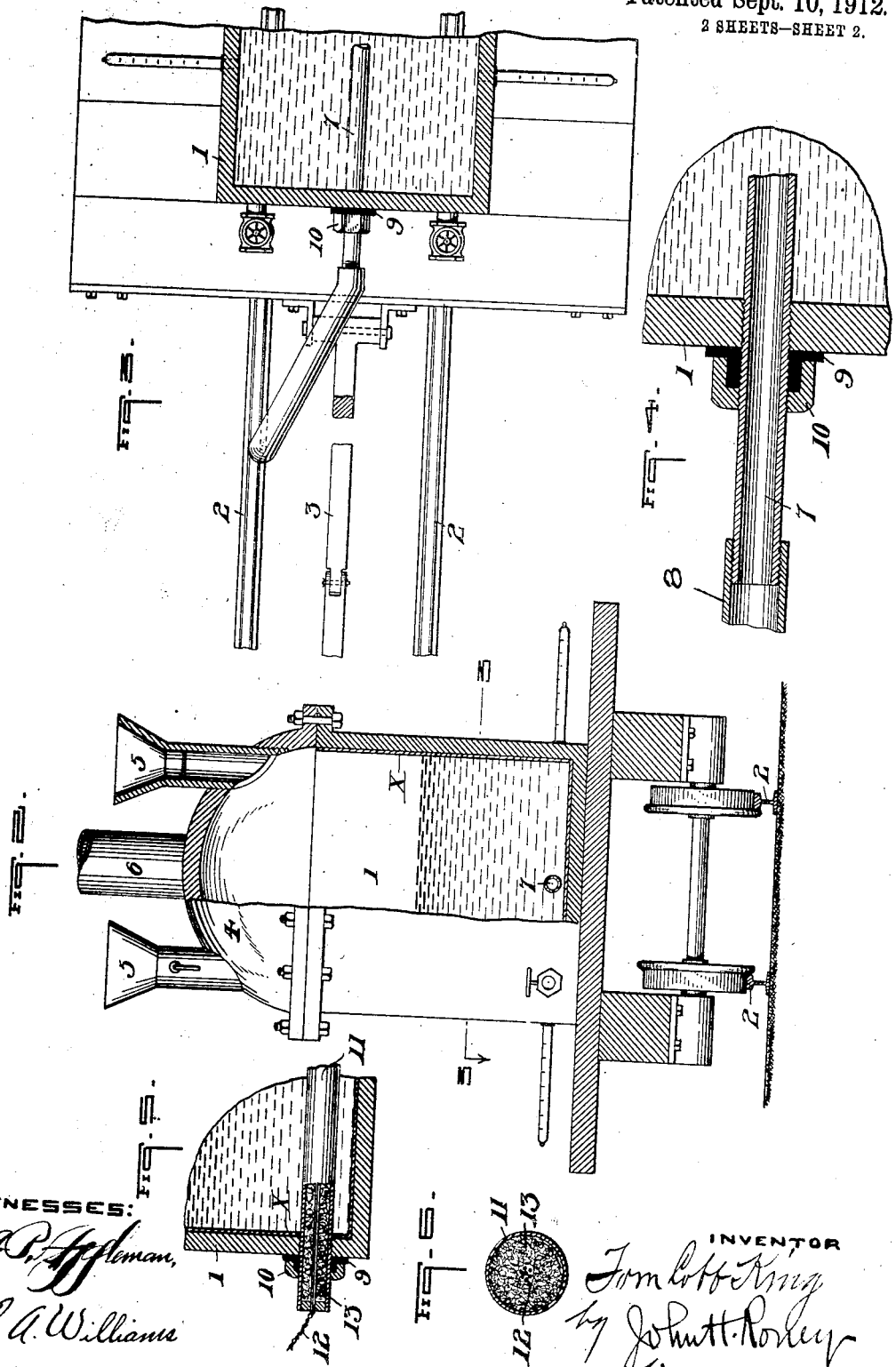

TOM COBB KING, OF EAST ORANGE, NEW JERSEY; MARY H. KING EXECUTRIX OF SAID TOM COBB KING, DECEASED.

APPARATUS FOR HEATING AND UTILIZING HYDROCHLORIC ACID.

1,038,389.            Specification of Letters Patent.     Patented Sept. 10, 1912.

Application filed September 21, 1907.  Serial No. 393,904.

*To all whom it may concern:*

Be it known that I, TOM COBB KING, a citizen of the United States, residing at East Orange, in the county of Essex and State of New Jersey, have invented a new and useful Improvement in Apparatus for Heating and Utilizing Hydrochloric Acid, of which improvement the following is a specification.

My invention relates to improvements in apparatus for use in metallurgical operations employing hot hydrochloric acid.

The object of my invention is to produce an apparatus for use in such operations in which the acid used may be heated and maintained in that condition, and, with the materials under treatment, agitated during the operation. I accomplish this object by means of the device hereinafter described, reference being had to the accompanying drawings, forming part hereof, in which—

Figure 1 is a side elevation, partly in section, of my improved device. Fig. 2 is an end elevation, partly in section, of the same. Fig. 3 is a section on line 3—3 of Fig. 2. Fig. 4 is a section on line 4—4 of Fig. 1. Fig. 5 is a fragmentary view of a modification of means of heating the vessel. Fig. 6 is a cross section through resistance tube.

Heretofore, so far as I am aware, it has been impossible to produce a vessel or apparatus for use in metallurgical operations involving the use of hot hydrochloric acid, in which the acid used could be heated and maintained in this condition during the operation, and at the same time be impervious to the solvent action of the acid, and this difficulty was augmented when it was necessary or desirable as in the present instance to agitate or disturb the acid and materials during the operation, in order to produce rapid solution. Metals could not be used in the construction of such apparatus as all the metals, excepting a few of the rare metals, are more or less soluble in the presence of acid, and particularly hot acid, the few metals excepted being prohibitive on account of the cost thereof. Glass was only possible in the production of vessels for laboratory practice and vessels made of glazed ware, earthen ware or porcelain, from the fact that the acid was heated by heat externally applied to the vessels containing the acid, required a very long time to transmit such heat to the acid, and when so heated it was impossible to regulate the temperature.

I have discovered that copper, one of the best conductors of heat, and certain alloys of copper, when completely submerged in hot hydrochloric acid and unexposed to air can be employed in the construction of a device to transmit heat to the acid, notwithstanding that if it were subjected to the acid without observing the specified conditions it would be soluble to a very great extent and consequently not a suitable material from which to construct vessels for use in such operations. This discovery enables me to use a copper tube, or a copper bar, for the transmission of heat requisite in such operations, in the construction of a simple and efficient apparatus adapted to treat metalliferous bodies with hot hydrochloric acid and convert the metallic content into a solution on a large and commercial scale.

Referring to said drawings, 1 is a vessel mounted on wheels supported on a track or ways 2, and capable of being reciprocated thereon by means of the crank mechanism 3, which may be actuated by any suitable power. The said vessel may be constructed of any suitable materials, but is preferably constructed of wood, and provided with a lining $x$ of any suitable substance insoluble in acid, as, for instance, glazed ware, porcelain or earthen ware, and is provided with a cover 4 bolted or otherwise suitably secured thereto. The said cover is provided with a pipe or pipes 5, 5, through which the materials to be treated may be charged into the vessel, also with a pipe 6, through which the gases evolved during the operation may be conveyed to some suitable holder, (not shown. The contents, and particularly the hydrochloric acid charged into said vessel are heated by heat radiated from the copper tube 7, or from a copper bar of suitable cross section to produce the requisite resistance, which is in the bottom of said vessel and extends therethrough, the ends being so secured that air is excluded from contact with the acid and the pipe at a point adjacent to the acid contained in the vessel. The ends of said tube projecting from said vessel may be connected to any suitable steam supply pipe 8, an asbestos gasket 9 being interposed between the vessel and the jam nut 10, or, as shown in the modification Fig. 5, the tube 11 may be filled with any suitable electrical resistance material 12, as, for instance, coils of German silver wire, and the said resistance suitably insulated from said tube by any insulation which will withstand a high heat, as, for instance, asbestos fiber or mineral wool, 13. The passage of an electric current through the resistance material generates heat which radiating from the tube heats the contents thereof. Or, a bar of copper of requisite cross section to produce sufficient resistance, may be employed.

I claim as my invention and desire to secure by Letters Patent:

1. In an apparatus for treating metalliferous bodies with hot hydrochloric acid, the combination of the vessel having a lining proof against hot hydrochloric acid, a heat transmitting substance proof against hot hydrochloric acid when submerged therein, and unexposed to the atmosphere, and means to transmit heat through said heat transmitting substance.

2. In an apparatus for treating metalliferous bodies with hot hydrochloric acid, the combination of a vessel having a lining proof against hot hydrochloric acid, means to reciprocate said vessel for the purpose of agitating the hot acid and the metalliferous bodies contained therein, a copper tube so located in said vessel as to be submerged in the acid contained therein, and unexposed to the atmosphere, and means to transmit heat through said tube to the contents of said vessel.

In testimony whereof, I have hereunto signed my name in the presence of two subscribing witnesses.

TOM COBB KING.

In the presence of—
 M. D. CULLEN,
 J. H. KING.

Copies of this patent may be obtained for five cents each, by addressing the "Commissioner of Patents, Washington, D. C."